US007274032B2

(12) United States Patent
Mosteller et al.

(10) Patent No.: US 7,274,032 B2
(45) Date of Patent: Sep. 25, 2007

(54) DOCUMENT PROCESSOR WITH OPTICAL SENSOR ARRANGEMENT

(75) Inventors: Herb Mosteller, Brandamore, PA (US); Edward M. Zoladz, Jr., West Chester, PA (US); Kenneth B. Wood, Downingtown, PA (US); David C. Deaville, West Chester, PA (US)

(73) Assignee: MEI, Inc., West Chester, PA (US)

( * ) Notice: Subject to any disclaimer, the term of this patent is extended or adjusted under 35 U.S.C. 154(b) by 0 days.

(21) Appl. No.: 11/302,806

(22) Filed: Dec. 14, 2005

(65) Prior Publication Data

US 2006/0173574 A1 Aug. 3, 2006

Related U.S. Application Data

(60) Provisional application No. 60/635,758, filed on Dec. 14, 2004.

(51) Int. Cl.
*G06K 5/00* (2006.01)
*G06K 11/00* (2006.01)
*H01J 3/14* (2006.01)

(52) U.S. Cl. ....................... 250/556; 250/216; 250/573

(58) Field of Classification Search ............. 250/559.4, 250/556, 559.01, 577, 216, 573, 574; 356/71; 382/135, 137, 138; 194/205, 206; 235/379–381; 902/8–16; 283/91; 700/231; 359/833, 834
See application file for complete search history.

(56) References Cited

U.S. PATENT DOCUMENTS

| | | | | |
|---|---|---|---|---|
| 4,998,022 | A * | 3/1991 | Tregay | 250/577 |
| 5,280,333 | A | 1/1994 | Wunderer | |
| 5,442,435 | A * | 8/1995 | Cooper et al. | 356/133 |
| 5,616,915 | A | 4/1997 | Simpkins et al. | |
| 5,988,345 | A | 11/1999 | Bergeron et al. | |
| 5,997,121 | A * | 12/1999 | Altfather et al. | 347/7 |
| 6,441,891 | B1 | 8/2002 | Levasseur et al. | |
| 2003/0081197 | A1 | 5/2003 | Zoladz, Jr. et al. | |

* cited by examiner

*Primary Examiner*—Thanh X. Luu
*Assistant Examiner*—Suezu Ellis
(74) *Attorney, Agent, or Firm*—Fish & Richardson P.C.

(57) ABSTRACT

An apparatus for document processing comprises an optical sensor including a light source, a light detector and an optical element. The optical sensor is adapted so that, during operation of the apparatus, at least a first portion of light from the source that enters the optical element travels along paths in the optical element so as to be re-directed by total internal reflection toward the detector and wherein the total internal reflection is maintained when the optical element is wet. Signals form the optical sensor may be used to determine, for example, the state of a document storage cassette or the location of a document with respect to the cassette.

37 Claims, 12 Drawing Sheets

RESET LIGHT PATH
THROUGH FACET 2

RESET LIGHT PATH
THROUGH FACET 3

DOCUMENT PROCESSOR WITH OPTICAL SENSOR ARRANGEMENT

RELATED APPLICATION

This application claims priority to U.S. Provisional Patent Application No. 60/635,758, filed on Dec. 14, 2004. The disclosure of that application is incorporated herein by reference.

TECHNICAL FIELD

This disclosure relates to optical sensing means in document processors and, in particular, to sensing means designed to resist fluid attack.

BACKGROUND

Document acceptor assemblies, such as those used in the vending and gaming industries, typically contain sensing means to detect the physical presence of a media being processed, or to detect the transitional state of movable elements in the machine. An effective and widely-used type of sensing means is optical sensing means, which may include a light source and a light receiver. Such sensors typically have no moving parts and do not require any physical contact with the object being sensed in order to function properly.

Document acceptors that are used for unattended payment systems, such as vending machines, are sometimes subjected to attack by various liquids, possibly as a result of fraud or vandalism to the machine itself. Another source of the hazard comes from condensation conditions which may occur when these devices are installed outdoors.

If an optical sensing device relies on a reflective surface to control and detect a light path, the presence of a liquid or film of condensation on that reflective surface may obstruct the light path and cause the sensing device to fail. One known solution to this problem involves applying a barrier coating to the optical surface. Applying a high quality mirror plating, for example, to the optical surface may maintain the effectiveness of the sensor. However, the process of applying the mirror plating can be relatively expensive and fraught with opportunities for quality control issues to arise and disrupt the machine's operation.

SUMMARY

This disclosure describes optical sensor arrangements for a document processor (e.g., a bill acceptor).

In one aspect, an apparatus for document processing comprises an optical sensor including a light source, a light detector and an optical element. The optical sensor is adapted so that, during operation of the apparatus, at least a first portion of light from the source that enters the optical element travels along paths in the optical element so as to be re-directed by total internal reflection toward the detector and wherein the total internal reflection is maintained when the optical element is wet.

Various implementations may include one or more of the following features. For example, the apparatus may include a document acceptor portion, and a transport system to move a document into a document storage cassette coupled to the document acceptor portion. The acceptor portion may house the light source and light detector. The optical element is located such that, during operation of the apparatus, if a document is being pushed into the cassette, the document at least partially blocks light from the optical element that is directed toward the detector. The optical element may be located, for example, adjacent to a slot adapted for the document to pass through from the acceptor portion to the document storage cassette.

The acceptor portion may include a microcontroller adapted to process signals from the light detector to determine a position of a document with respect to the cassette. For example, the microcontroller may determine, based on signals from the detector, whether a document is being pushed into the cassette for storage therein. The microcontroller also may determine, based on signals from the detector, whether the document has completely passed into the cassette.

The optical element may be implemented in various ways. For example, it may comprise a prism light-pipe structure or a smoothly curving three-dimensional toroidal light-pipe structure.

The optical sensor arrangements may improve the functionality of the document processor in situations where liquid ingress threatens the functionality of the machine without the added cost associated with barrier coating.

The same optical sensor arrangement may provide additional functions as well. For example, according to some implementations, a pusher plate in the document storage cassette includes a reflective portion. The optical element of the optical sensor may be adapted so that a portion of the light that enters the optical element passes through the optical element and is reflected by the reflective portion toward the detector. As the amount of light reflected by the reflective portion toward the detector depends on the position of the pusher plate in the cassette, the amount of light detected by the detector can be used to determine the state of the cassette. For example, in a particular implementation, the reflective portion may reflect less light back toward the detector when the cassette is full, compared to an amount of light it reflects back toward the detector when the cassette is not full. A microcontroller in the acceptor portion may be adapted to determine a position of the pusher plate in the cassette based on signals from the detector. The microcontroller also may be adapted to use signals from the detector to determine whether the cassette is full, whether contents of the cassette have been removed, or whether the cassette is present (e.g., whether the cassette is still attached to the acceptor portion).

The details of one or more embodiments are set forth in the detailed description below, the accompanying drawings and the claims. Other features and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
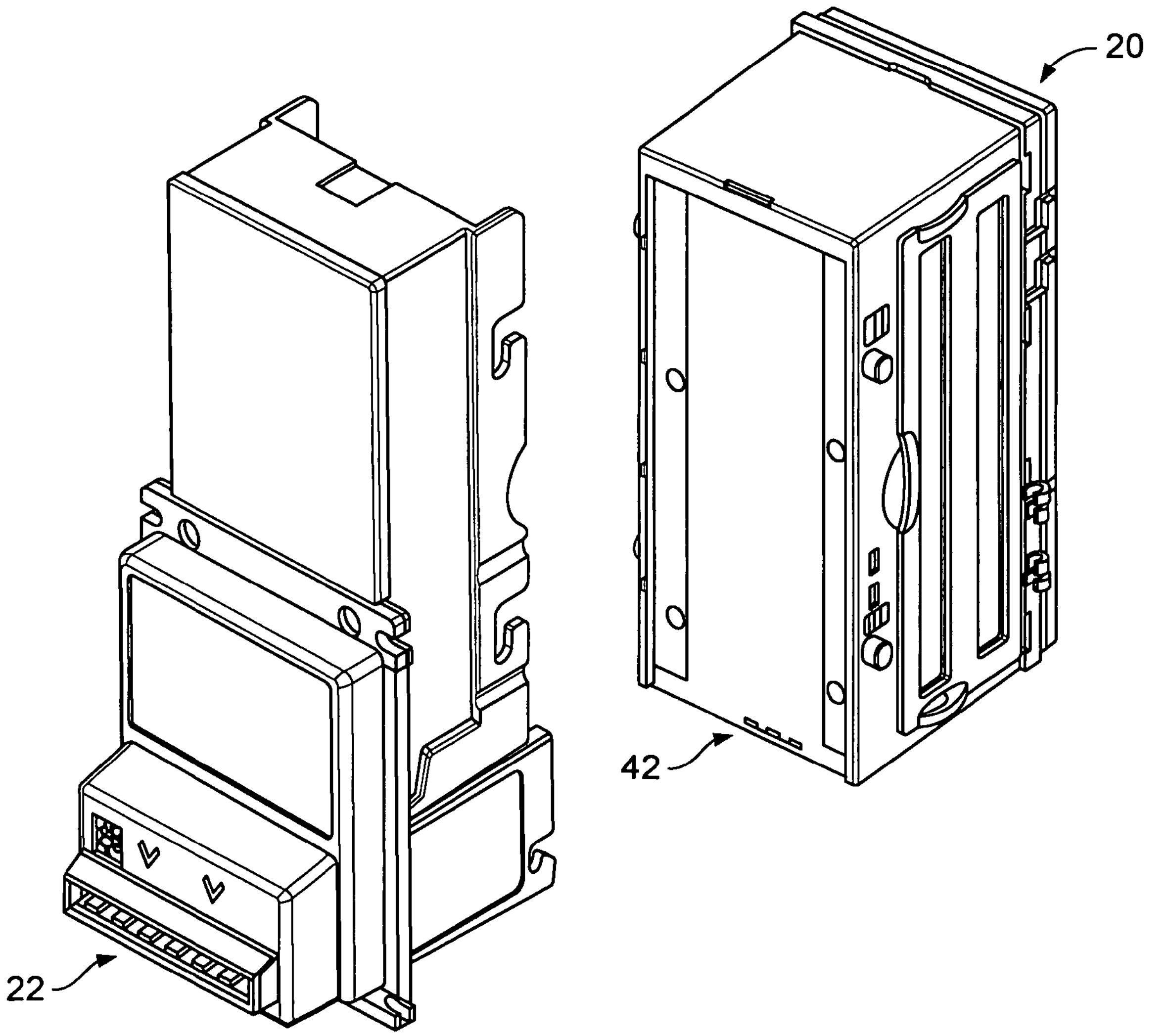
FIG. 1 illustrates a document processor such as a banknote acceptor.

FIG. 1 shows an example of a document acceptor such as a banknote acceptor commonly used in vending machines. Validated banknotes are stored in a magazine or holder called a cassette 20. The banknote acceptor includes a slot 22 through which a banknote is inserted into the machine. The banknote acceptor portion may include a motor that drives rubber belts which bear against roller balls involved in transporting a banknote through the passageway. The validator portion may include various optical, electronic, or other sensors to determine the denomination of the banknote as well as whether it is authentic. Techniques of stacking banknotes inside the cassette using a pusher plate are well known in the art and will not be further discussed herein.

Figure 2:
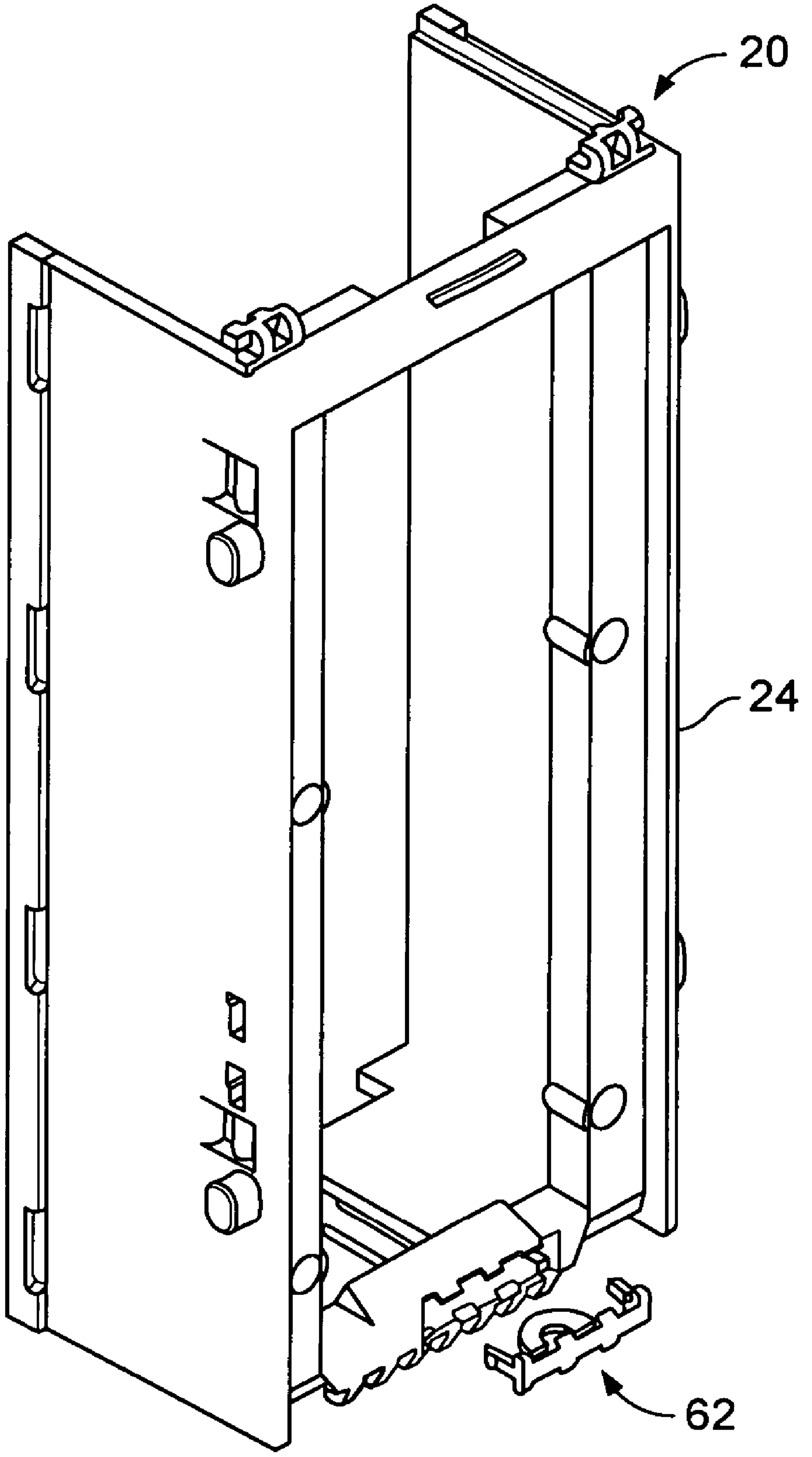
FIG. 2 illustrates a cassette frame and the location of a prism light-pipe.

The document acceptor of FIG. 1 may include sensors which detect the progress of the document as it is pushed into the cassette 20. FIG. 2 shows an example of an optical sensor 62 and its location with respect to the frame 24 of the cassette 20. The sensor disclosed below and shown in FIG. 2 has multiple functions. One function is to detect when a document such as a banknote initially enters the cassette 20 and when it has passed completely into the cassette. Another is to detect the removal of a cassette 20 from the acceptor, and also the removal of the documents from the cassette 20.

Figure 3:
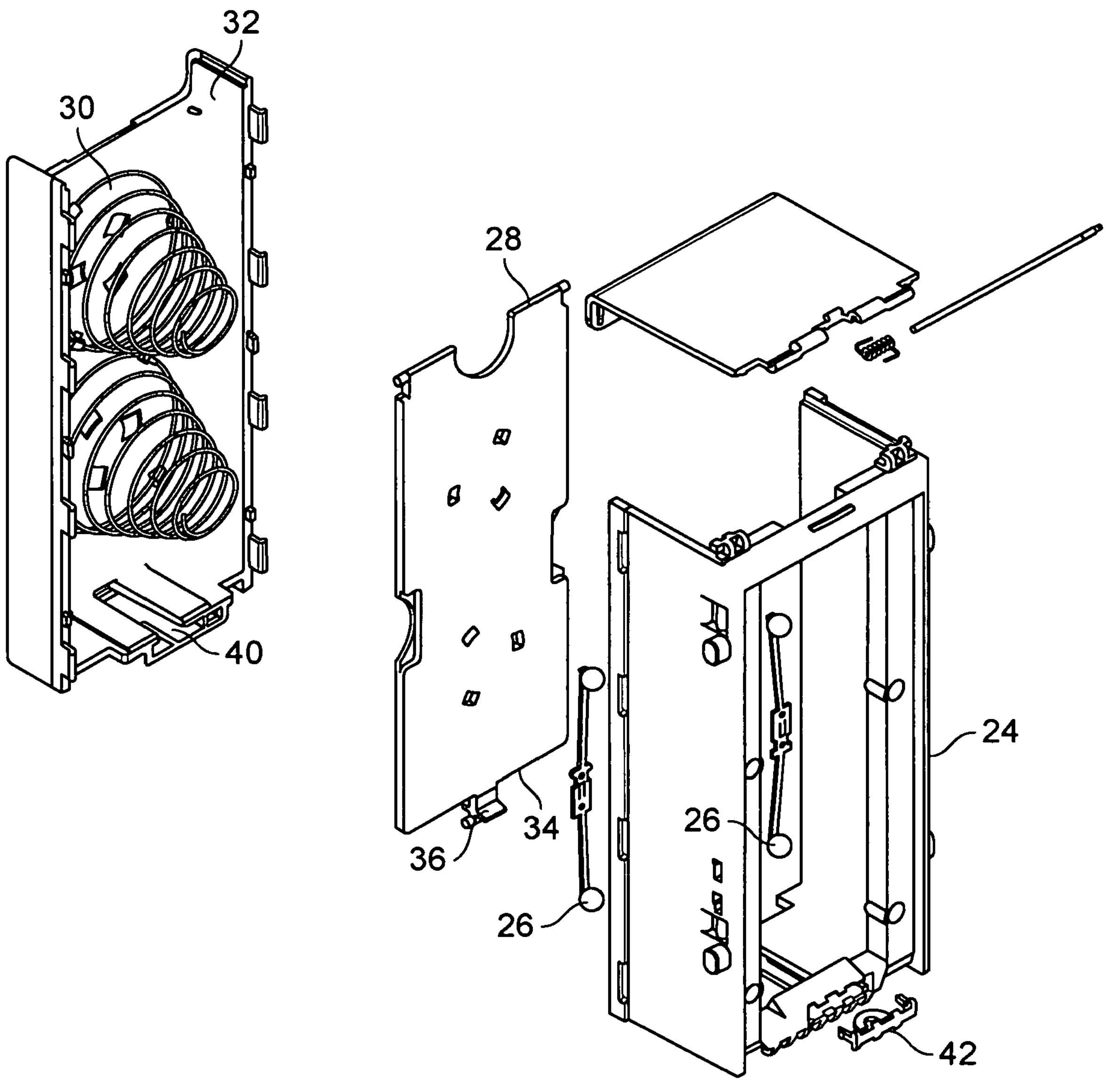
FIG. 3 is an exploded view of the cassette.

FIG. 3 shows an exploded view of a particular implementation of the cassette 20. In addition to the cassette frame 24, the banknote acceptor contains a roller-ball and clip system 26, driven by the motor as mentioned above, to move the banknote into the body of the cassette storage area. The document acceptor includes a pusher plate 28 which is biased by the operation of springs 30 attached to the back cover 32 of the cassette frame 24. The bottom edge 34 of the pusher plate 28 includes a protrusion, or flag 36, which is coated with a reflective surface, such as a reflective foil. The flag 36 slides into a mating channel 40 in the back cover 32 of the cassette 20. The function of the flag 36 is discussed below.

Figure 4:
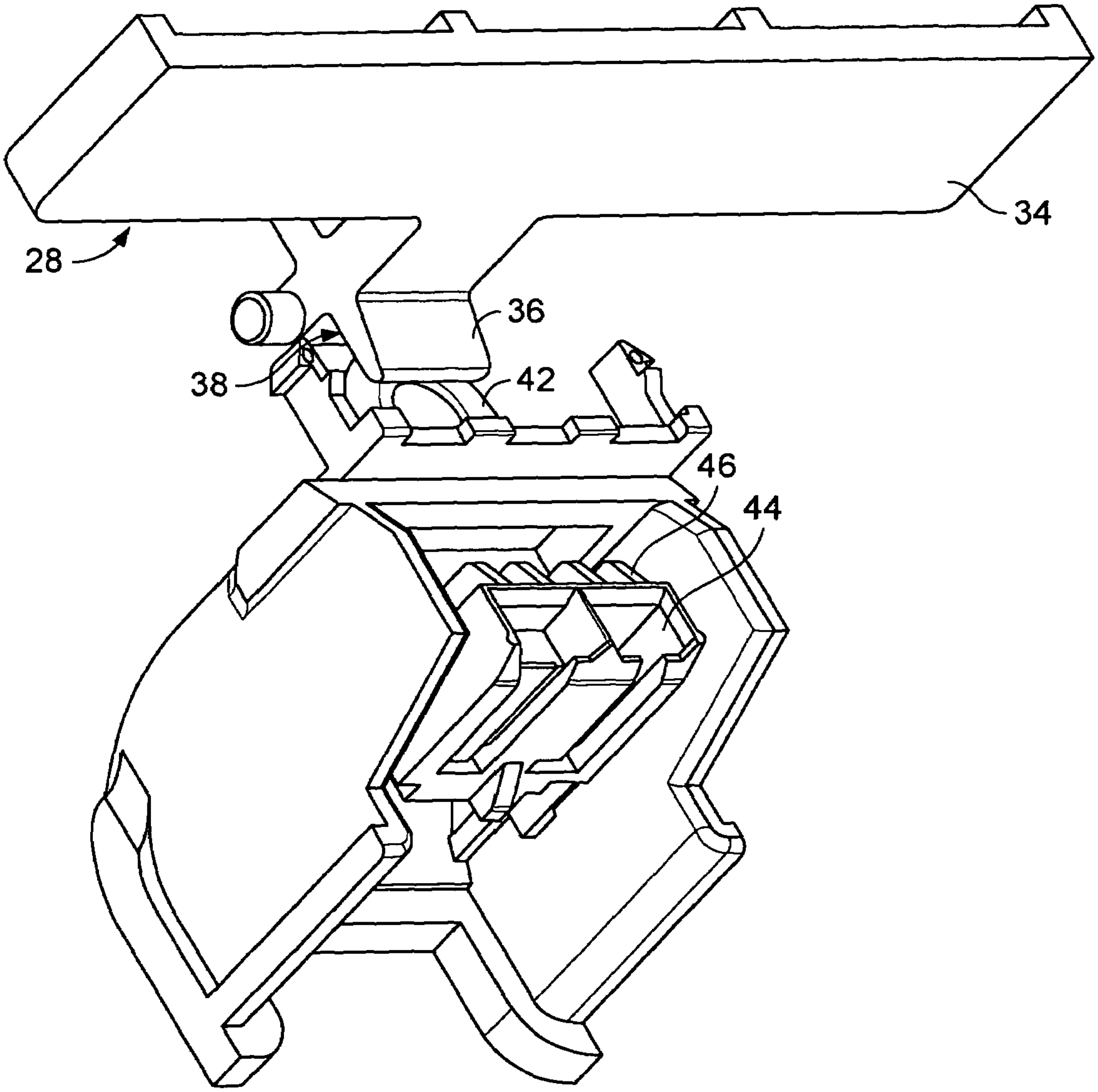
FIG. 4 illustrates the relative orientation of a sensor arrangement.

The document acceptor also includes a prism light-pipe sensor arrangement. As illustrated in FIGS. 3 and 4, the prism light-pipe sensor arrangement includes a prism light-pipe 42, a light source 44 such as a light emitting diode (LED), and a light detector 46. The sensor arrangement allows the document acceptor to detect the back of a banknote as it enters the cassette 20. During operation, light from the source 44 may be directed to the detector 46 through the prism light-pipe 42 attached to the cassette 20. When the light passes through the banknote path of the acceptor, it is interrupted while the banknote is being transported to the stacking area in the cassette. The light is uninterrupted again once the banknote has passed completely through to the stacking area. While the banknote blocks the light, the optical receiver/detector 40 detects a smaller light signal. The changes in the detected light signal can be used to indicate the presence of a banknote being pushed into the cassette 20 and to indicate that the banknote has passed completely through to the cassette. This will be discussed more below.

Signal detection may occur through the detector 46, which may be a phototransister coupled to a resistor, that converts the generated photocurrent into a voltage, which is then measured by an analog-to-digital converter. A micro-controller located within the validator portion processes the output signals from the light detector 46 and distinguishes between possible states to determine whether a banknote is being pushed into the cassette and when it has passed completely into the cassette.

As mentioned above, liquid ingress may interfere with a signal if the light path encounters a wet reflecting surface. The water or other liquid modifies the properties of the reflector's surface so that the light becomes redirected in an unintended direction. As a result, the optical signal loses its strength.

To address this problem, the present optical sensor arrangement makes use of the optical phenomenon known as total internal reflection (TIR). This phenomenon occurs when light travels through one medium and encounters a boundary with another medium at an angle greater than the critical angle for TIR, as given by Snell's law. While light incident at an angle below the critical angle is refracted outside of the media, light incident at an angle greater than the critical angle is substantially completely reflected internally, maintaining the integrity of the light signal. According to Snell's law, this critical angle is equal to the (arc)(sin) of the ratio of the indices of refraction of the two abutting mediums. In accordance with the present disclosure, the prism light-pipe 42 is designed so that total internal reflection occurs even in the presence of a liquid such as water.

According to a particular implementation, the prism light-pipe 42 is made by an injection-mold process using a plastic; for example, polycarbonate. The relevant indices of refraction (n) are as follows:

| | |
|---|---|
| Air | n = 1.003 |
| Polycarbonate | n = 1.55 |
| Water | n = 1.33 |

Figure 5A:
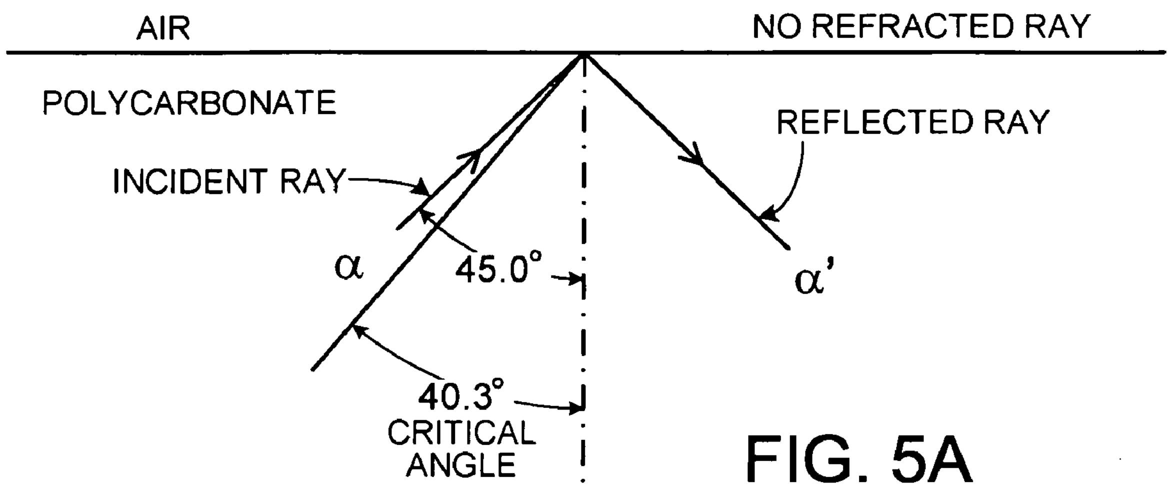
FIG. 5*a* illustrates the angle geometry of the critical angle for a polycarbonate/air interface.
Figure 5B:
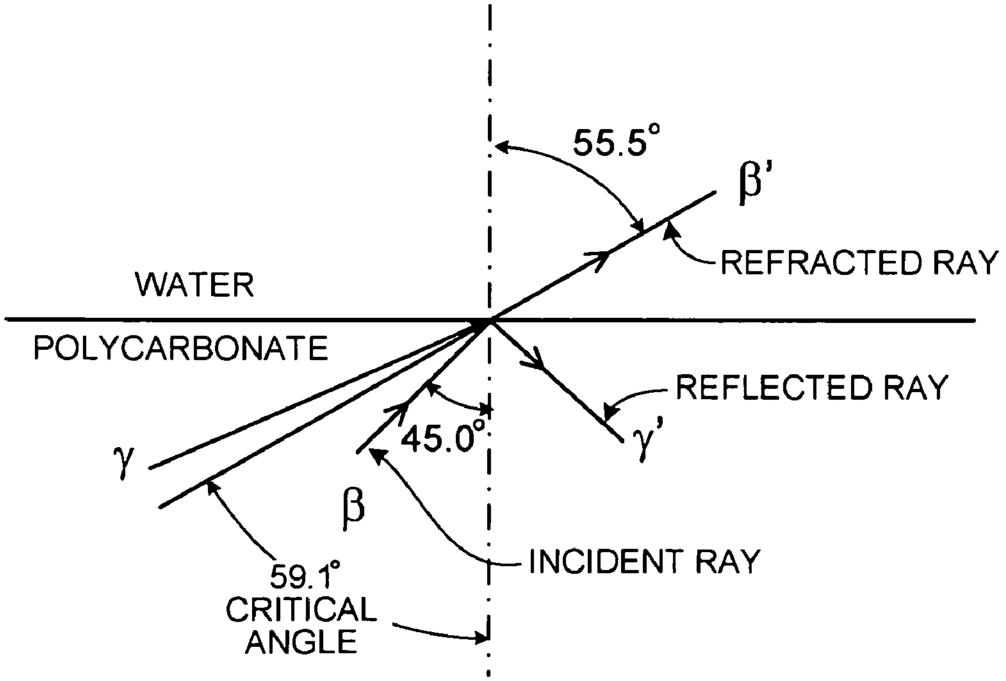
FIG. 5*b* illustrates the angle geometry of the critical angle for a polycarbonate/water interface.

Therefore, the critical angle of reflection, and the angle at which the light path will be totally internally reflected, changes for the polycarbonate light-pipe between dry and wet states. FIG. **5*a* shows the critical angle of 40.3° for the polycarbonate light-pipe in its dry state, i.e., when bordering air. An incident ray $\alpha$ is reflected internally $\alpha'$ if it is incident at an angle greater than that critical angle. Between polycarbonate and water, however, the critical angle is 59.1°. FIG. 5*b*** shows an incident ray $\beta$ hitting the interface of water and polycarbonate at an angle less than the critical angle of 59.1° and being refracted out, as well as a ray $\gamma$ hitting the medium at an angle greater than the critical angle and being reflected internally as a $\gamma'$. Thus, light will either be reflected inward or refracted out, depending on its angle of incidence.

The surfaces of the prism light-pipe 42 are arranged so that even when wet, TIR will still occur, making the sensor system less subject to liquid attack. In particular, the shape of the prism light-pipe 42 is such that a light beam entering at any angle from the source 44 will be, by design, incident at an angle greater than the critical angle, to maintain internal reflection for both the wet and dry states. If substantially all of the light rays incident to the surface of the light-pipe are reflected internally, almost none is lost to refraction and the light signal is preserved.

Various shapes can provide this resistance to liquid in a given application. Two particular embodiments are disclosed, although other geometries are within the scope of the invention.

The first embodiment uses a faceted prism with angles chosen to achieve TIR.

The second embodiment utilizes a toroidal light-pipe with a central web plane.

Figure 6:
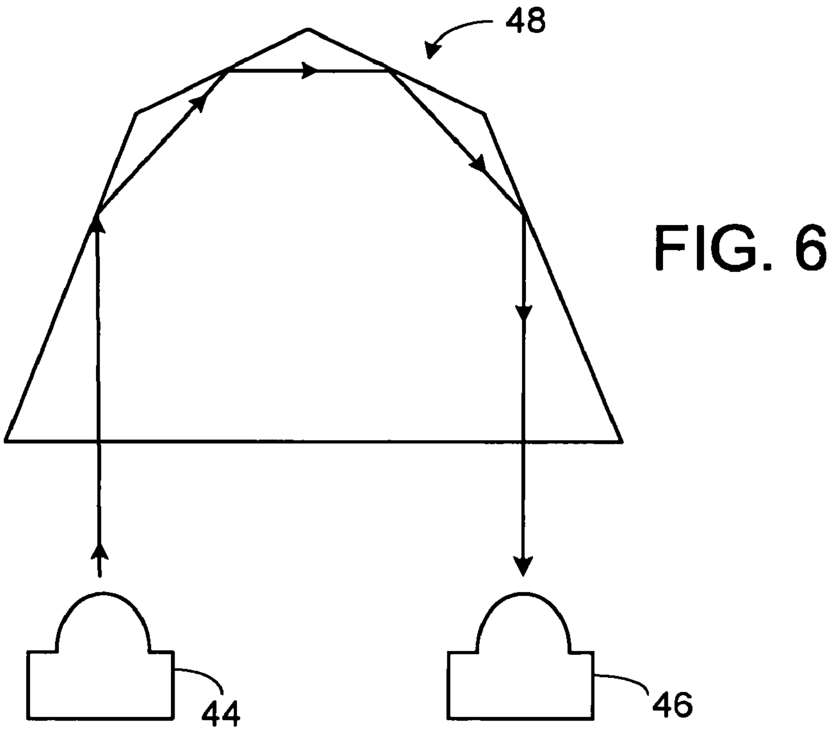
FIG. 6 illustrates a faceted prism embodiment.

FIG. 6 shows an enlarged view of an example of the faceted 48 prism light-pipe 42. This example includes four facets, but other implementations are possible and are within the scope of the invention. This faceted prism 48 structure is designed to provide for total internal reflection even when the prism is submerged in water. For example, the figure shows one possible implementation, where the internal angles are 22.5. degree relative to each segment of the main optical beam. The light beam travels from the light source 44, to the faceted prism 48, and is reflected internally. The optical signal exiting the faceted prism 48 is detected by the receiver 46. The facets are labeled facet 1, 2, 3, and 4 in FIG. 7. The portions of each facet 1, 2, and 3 where the incoming light may be incident in this embodiment are labeled 56, 58, and 60. One portion 56 of facet 1 is involved in the reflection of the light path maintained in TIR. The entire length 58 of facet 2 and another portion 60 of facet 1 are involved in another possible function of the sensor, discussed below.

Figure 8:
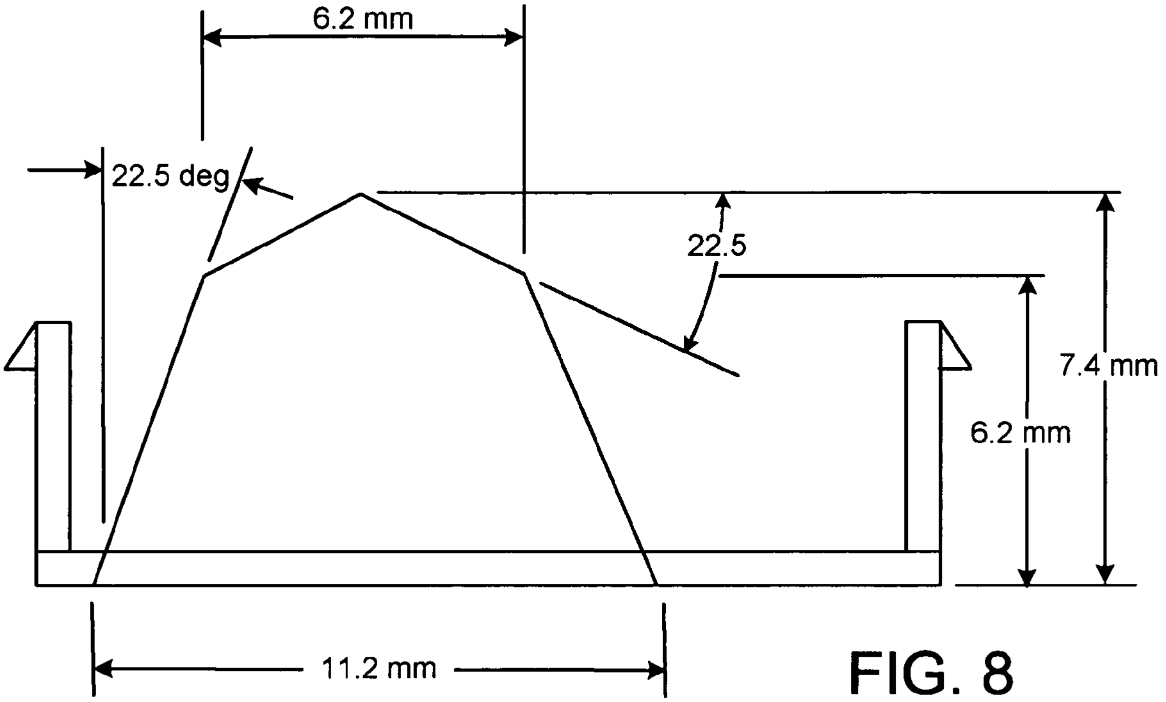
FIG. 8 is an example of a dimensional sketch of the faceted prism embodiment.

FIG. 8 shows an example of a faceted embodiment 48 with specific dimensions. It includes internal angles of 22.5°, an overall height of 7.4 mm, and a thickness of 3.3 mm.

Figure 9:
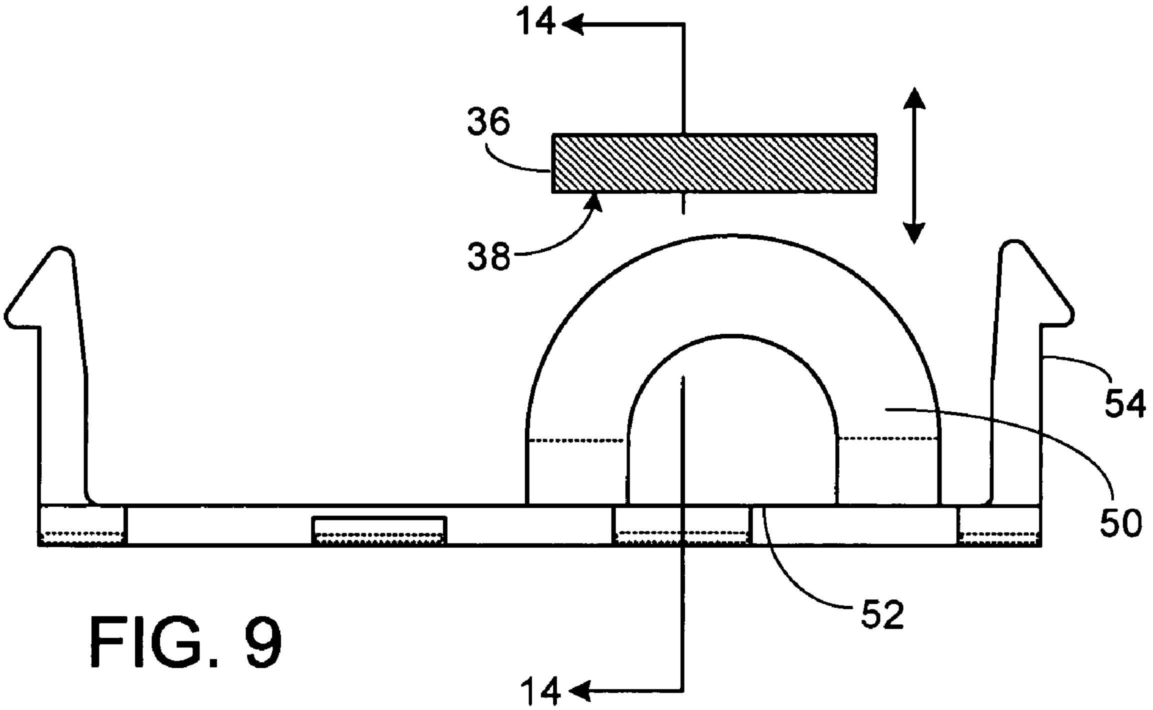
FIG. 9 illustrates a light-pipe with a smoothly curving surface.

FIG. 9 shows a second embodiment of the prism light-pipe having a toroidal shape and a smoothly curving surface. See also FIGS. 3 and 4. The toroidal light-pipe 50 may be composed of a clear plastic, for example, polycarbonate. The light emitted from the LED light source 44 enters into the toroidal light-pipe 50, is reflected around the curve of the toroidal light-pipe, and is detected by the receiver 46. Although light is subject to a large number of reflections in this toroidal system, the angle of reflection will remain greater than the critical angle for the media. This arrangement may perform at close to 100% efficiency, keeping overall device efficiency high as well. This performance is substantially unaffected by liquid contamination because total internal reflection occurs even if the toroidal light-pipe 50 is submerged in water.

The optical sensor arrangement also can be used to perform reset related functions. Although both of the embodiments described above have structures designed to maintain TIR in a non-leaking system in the presence of liquid, some light may be intentionally leaked out of the system for other purposes. One such purpose for intentional light-leakage is to enable the reset functions to be performed. Two possible specific reset functions are disclosed here, but other such implementations are within the scope of this invention. First, the optical sensor arrangement may be used to detect the "home position" of the pusher plate 28 to indicate that the cassette 20 is empty. Second, it may detect when the cassette 20 itself has been removed. Both of these may serve as the document acceptor's reset functions in the embodiments explained above.

Figure 10:
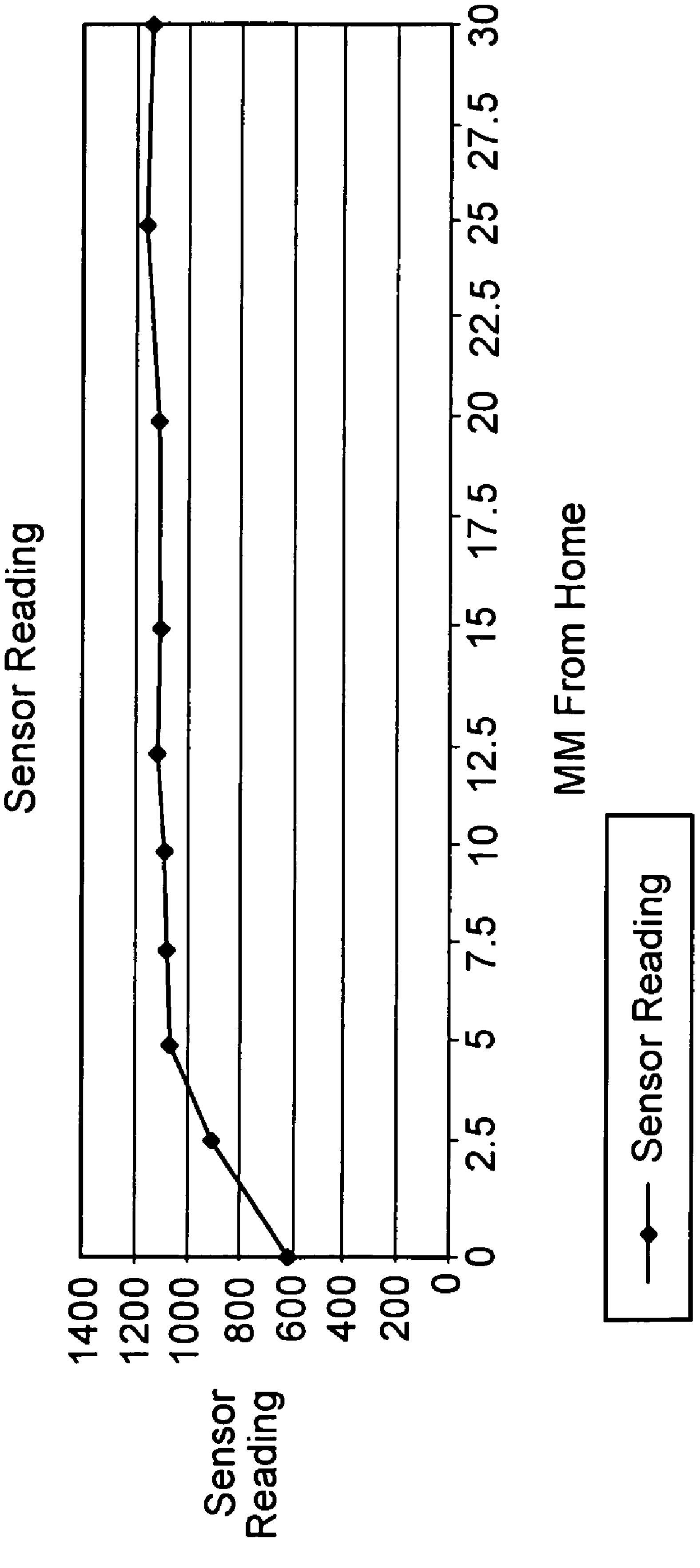
FIG. 10 is a graph depicting the relationship between the flag position and signal strength.

For both of the example embodiments, the interaction between the prism light-pipe 42 (e.g., faceted prism 48 or toroidal light-pipe 50) and the flag 36 enables the reset function. In normal operation, when the cassette is present, the sensor detects a baseline level of signal. In addition to this, when using the reset functions, the sensor detects a supplementary signal as a result of reflections from the flag 36 with the reflective surface. FIG. 10, discussed below, shows an example of the variance of this signal with respect to the flag position.

When the cassette 20 is full, the document acceptor goes out of service due to the motor within the document acceptor portion failing. In that state, the document acceptor is measuring and storing the signal state on the detector 46 as a baseline. When the cassette 20 is emptied, even if the cassette is not removed from the document acceptor, the pusher plate 28 returns to its home position (i.e., the flag 36 is pressed as closely as possible to the front face of the cassette), and the reflective foil 38 attached to the flag 36 increases the detected optical signal across the prism from the baseline. When the cassette is more full than empty (i.e., the flag 36 is far from the prism light-pipe), the light that is intentionally leaked out is far from the flag, permitting only a small amount, or even no light, to be incident on the reflective foil 38 and reflected back to the detector 46. When this state changes again (e.g., when the cassette 20 is emptied), and the light intentionally leaked out is close to the flag 36, more light will be incident on the reflective foil 38, and an increased cumulative signal is reflected back toward the detector 46. The detector then detects an increased signal as a result of the additive effect of the already-present TIR path and the path reflected from the flag 36. The document acceptor detects that the signal has changed (a step-signal) from the stored baseline, and resumes operation. The sensor can thus be used to detect the removal of the documents from the cassette.

A similar effect occurs when the cassette 20 itself is removed from the document acceptor, according to another of the reset functions. If the cassette is removed, and not just emptied as described above, no light signal originating from the light source 44 will be detected by the detector 46. That signal change will be detected as well. The sensor thus can be used to detect the presence or absence of the cassette. The foregoing related operations may be referred to collectively as "reset functions."

FIG. 10 depicts an example of a graph of the baseline and additive values the detector senses as a result of the reset operations. The baseline level is depicted, as are the variable levels, measured as a function of the flag position in relation to the prism light-pipe. The units of measurement in the vertical axis in this graph are millivolts.

In particular, the signal on the detector 46 has a baseline level when the cassette 20 is present, as a result of the light going in the prism light-pipe 42. There is also a variable component added to the baseline level that occurs when the flag 36 moves, (e.g., as the number of banknotes in the cassette changes, and the position of the pusher plate 28 and, thus the flag, changes) and the light hits the flag and is reflected back to the detector 46. The document acceptor tests signal intensity and variations to assess the presence or absence of the cassette.

The document acceptor may utilize a phototransistor as the detector 46 where the load resistor may be associated with either the light source 44 or the detector 46. Based on the arrangement of the sensor components, the signal shape between the two options is inverted. When the load resistor is coupled to the detector, the signal output by the detector is small when more light is received and becomes smaller when light is increased by the flag 36 at the home position. When the load resistor is coupled to the light source 46, the signal is increased when the light is increased.

Although a digital signal change is the preferred criteria to trigger a reset condition, it is possible to quantify the amplitude of the signal in an analog way and deduct the variable position of the flag/pusher plate and deduce the degree of filling of the cassette. Variations of this design may be used for a large variety of purposes within a document acceptor.

The reset sensing functionalities just described occur by different structural means in each of the above disclosed prism light-pipe embodiments.

In the faceted prism embodiment 48, portions of the output beam from the light source 44 are directed to the flag 36 through at least one portion of a facet (e.g., 56 on facet 1, or 58 on facet 2) and back from the flag through the same or another facet. This is an intentional leakage, separate from the light path maintained in the TIR condition. Other portions of the beam are maintained in TIR condition and are reflected around the prism from facet to facet, going from the source 44 to the detector 46. If near total efficiency of the prism system is desired, a lens can be provided to collimate the beam and prevent the leakage from occurring through the other facets.

Figure 7:
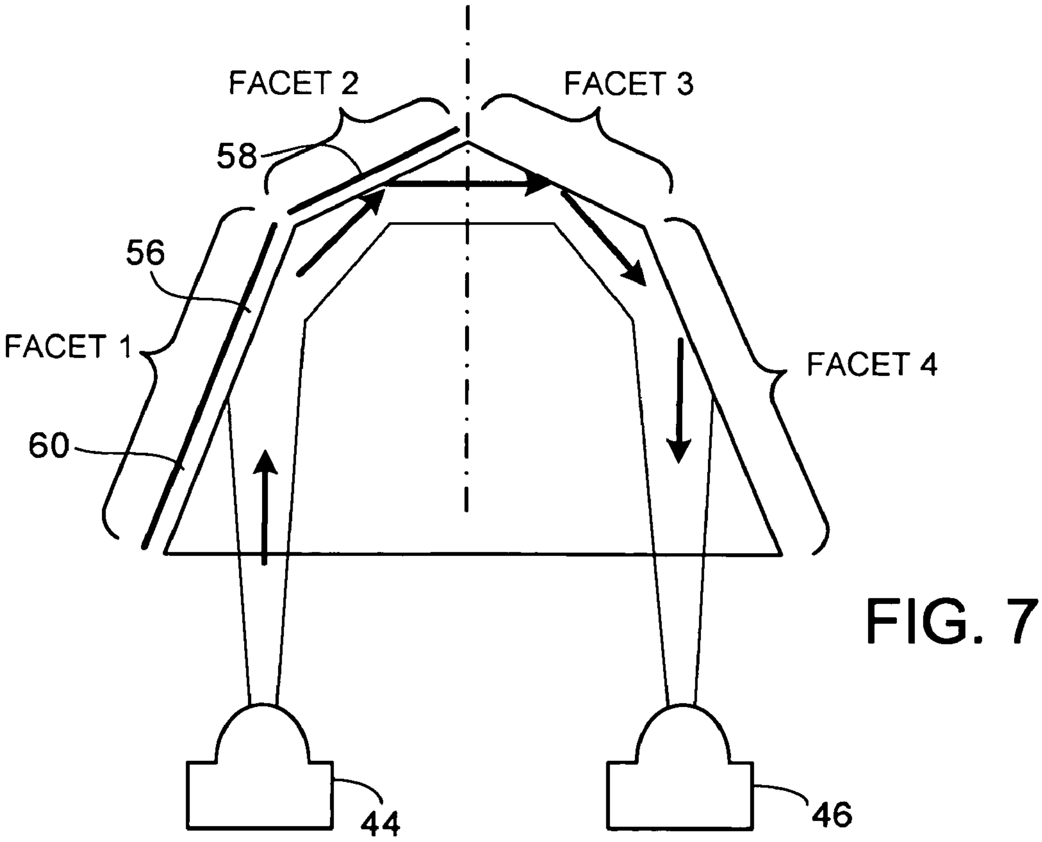
FIG. 7 shows a total internal reflection light path in the faceted prism embodiment.
Figure 11:
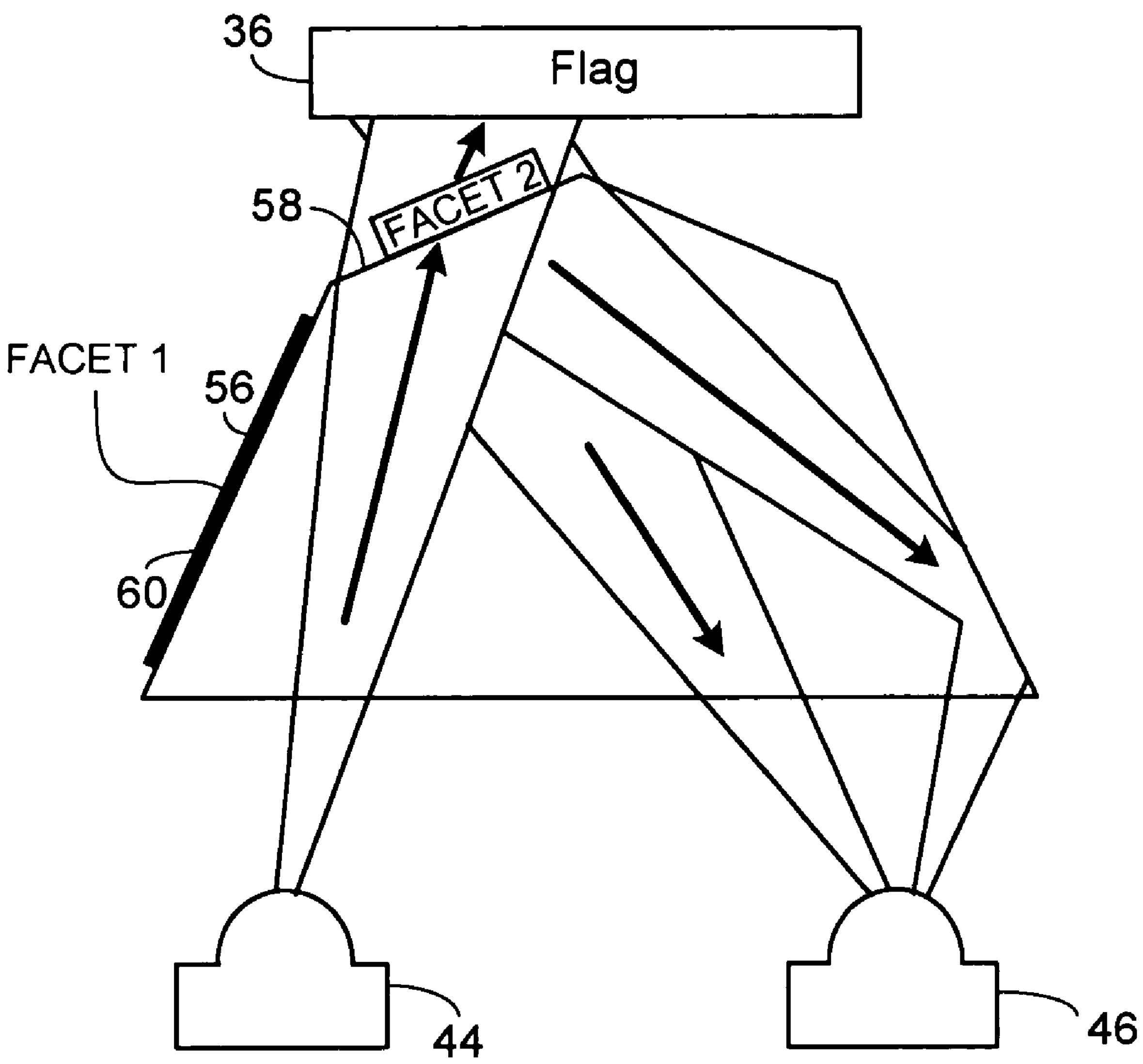
FIG. 11 shows a reset light path through a facet in the faceted prism embodiment.
Figure 12:
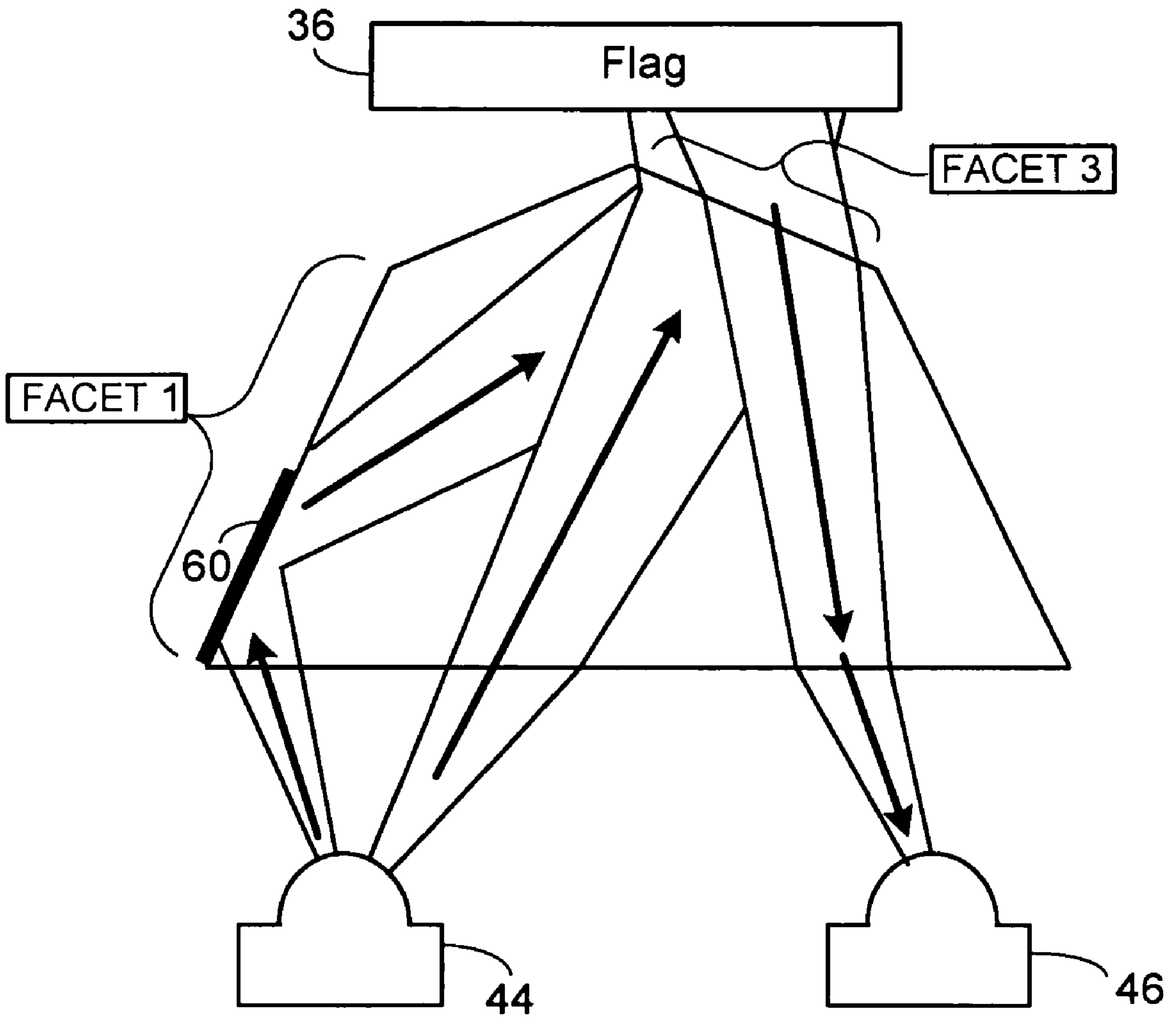
FIG. 12 shows a reset light path through another facet in the faceted prism embodiment.
Figure 13:
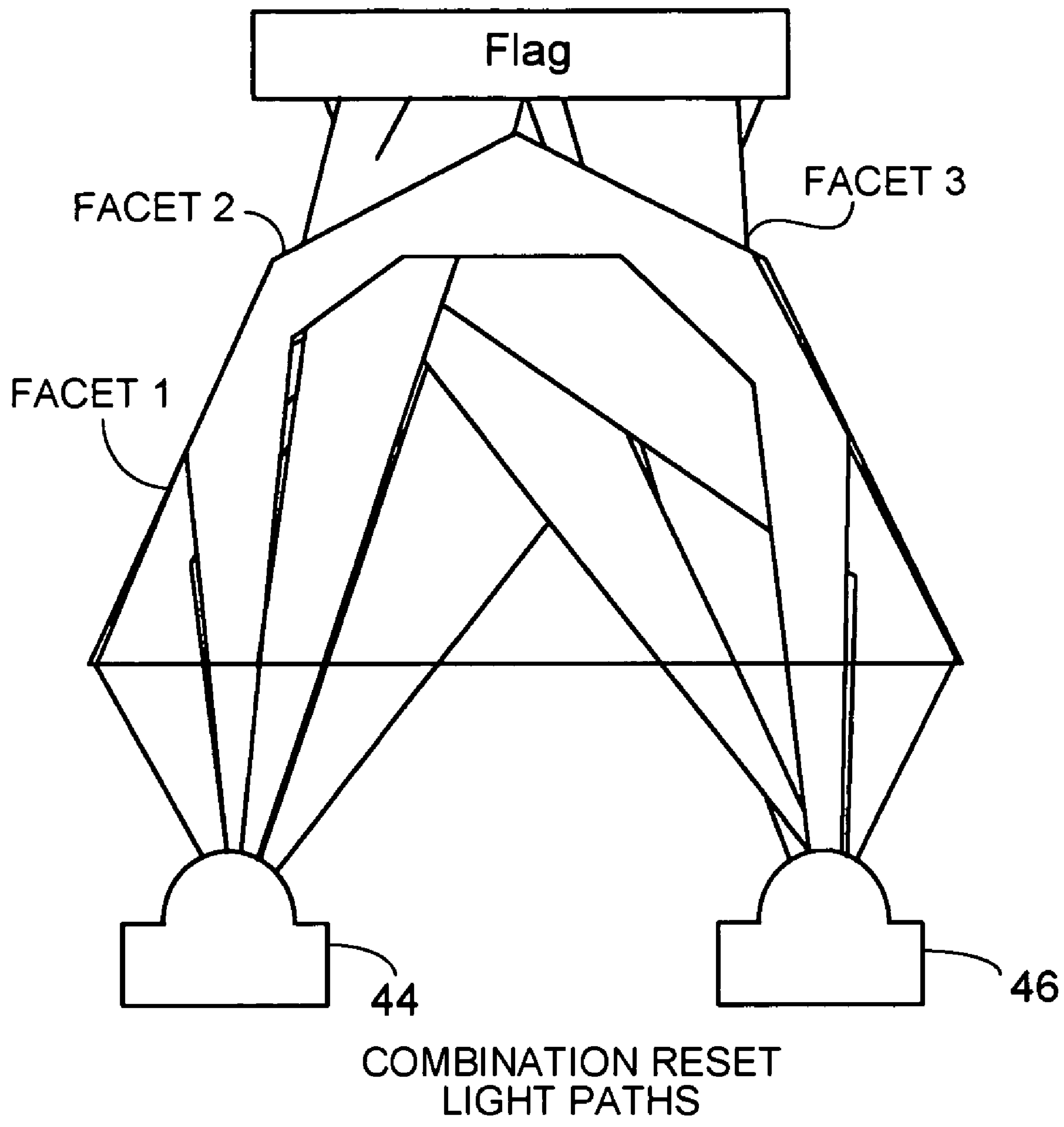
FIG. 13 shows an overlay of light paths in the faceted prism embodiment.

FIGS. 6 and 7, described above, show a light path from the light source 44 to the detector 46 that will maintain TIR. FIGS. 11 and 12 show divergent portions of light from the source 44 that are used in alternate paths to the detector 46 as part of the reset function. The portion of light which enters incident to portion 56 of facet 1 is the beam that is still totally internally reflected. The portion of light that comes from the source 44 and is incident on portion 58 on facet 2, however, is refracted toward the flag 36 and then reflected by the flag once again through facet 2, taking one of the two paths to the detector 46. The portion of light that travels from the source 44 to the portion 60 of facet 1 passes through facet 3 to the pusher plate 28 and is reflected back through facet 3 providing a larger reset signal to the detector 46. FIG. 11 depicts the path through the portion 58 on facet 2, and FIG. 12 shows the path through portion 60 on facet 1. All of the pathways shown in FIGS. 7, 11 and 12 are shown overlaid together in FIG. 13, to illustrate both TIR and reset related light paths.

When the stack of banknotes in the cassette 20 is empty, the pusher plate 28 (and the flag) is very close to the faceted prism 48 and, therefore, the detector 46 senses a lot of light reflected by the flag 36. As the cassette fills with banknotes, the pusher plate 28 is forced farther away from the faceted prism 48, and less light is reflected off the flag 36 back through the possible reset paths of the prism. As the cassette continues to be filled with banknotes, less and less light is reflected from the flag, until almost none is reflected when the cassette 20 is full. The detector 46 detects this change in signal strength, which indicates that the cassette 20 is full and is ready to be emptied. After the cassette 20 is emptied, the pusher plate 28 returns to its "home" position close to the faceted prism 48, once again reflecting more light to the detector 46. While the flag location's variability is not shown in FIGS. 7, 11 and 12, the arrangement and general proximity of the flag with respect to the prism light-pipe 42 can be seen, and it should be understood that the distance between the flag 36 and faceted prism 48 depends on the extent to which banknotes fill the cassette 20.

Figure 14:
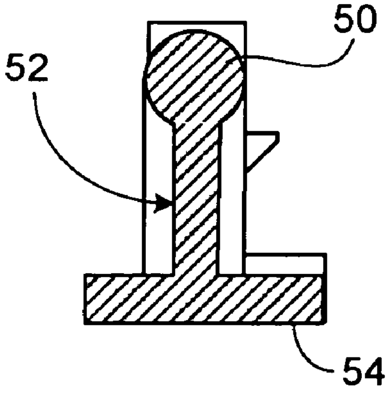
FIG. 14 is an alternative view of the design in FIG. 9 which shows the toroidal shape of the light-pipe.

FIG. 14 is a section view of the toroidal light-pipe embodiment 50. along section 14, shown in FIG. 9 and discussed above. In addition to depicting that the toroidal surface is curved in three dimensions, the web 52 is shown. The web 52 is indicated by the diagonal lines, spreading from the toroidal light-pipe 50 to the supportive piece. In the toroidal light-pipe embodiment 50, part of the light beam travels horizontally from the light source 44 through a web 52 to the flag 36, and is reflected back to detector 46. The web 52 is located in the plane of the toroidal light-pipe 50 and is substantially on the optical axis of the light source 44 and detector 46. By adjusting the web's thickness, the amount of light intentionally leaked from the TIR capable system can be made variable, as described below.

FIG. 9 shows the toroidal light-pipe 50 attached to a supportive piece with retaining clips 54 on the sides. The toroidal light-pipe 50 is off-center with respect to the supportive piece. Such asymmetry may be needed to align the light-pipe with both the light source 44 and the detector 46 in some arrangements. The flag 36 with the reflective foil 38 is at a variable distance from the edge of the toroidal light-pipe 50 depending on the extent to which the cassette 20 is filled with banknotes. The thin web 52 facilitates the process of allowing light leakage from the system for the reset function. The web 52 may be composed of a clear plastic, for example polycarbonate, and can be formed by using an injection-mold process. By including the web feature, a small amount of light leakage may intentionally be created. As mentioned above, a reflective surface such as a reflective foil 38 (see FIGS. 4 and 9) is attached to the flag 36 on the bottom edge 34 of the pusher plate 28. While the presence of the cassette alone creates a baseline signal in the document acceptor, as described above, the supplementary reflection from this reflective foil 38 surface yields additional signal, allowing the state of fill of the cassette 20 to be detected. The position of the moving plate is sensed because the proximity of the flag 36 to the toroidal light-pipe 50 affects the signal strength. A cassette with fewer documents will bring the flag 36 and toroidal light-pipe 50 closer, creating a stronger signal. A farther position for a fuller cassette yields a weaker signal. The web function in the toroid embodiment is analogous to what is accomplished using the alternate light beam paths through portions 58 and 60 in the faceted prism embodiment 48, but with more variability provided.

Furthermore, it may be desirable to adjust the proportion of the light reflected internally by the prism and the amount reflected by the flag 36. This conveniently may be accomplished by adjusting the thickness of the web 52. A thicker web allows more light to reach the flag. A thinner web causes more light to be reflected internally and less to be intentionally leaked. In the extreme case where the web 52 is not present, about 100% of the light may be reflected internally, and the reset function is not utilized. The ratio of web 52 thickness to the amount of internal light reflection is unaffected by surface dampness of the toroidal light-pipe 50.

When the pusher plate 28 and its flag 36 with the reflective foil 38 are relatively far from the toroidal light-pipe 50 (e.g., when the cassette 20 is full), the baseline signal detected by the detector 46 indicates the cassette's presence. Substantially the only light beams received at the detector 46 are those that reflect internally within the toroidal light-pipe 50 by TIR.

In contrast, when the pusher plate 28 and its flag 36 with the reflective foil 38 are closer to the toroidal light-pipe 50, light leaked through the web 52 is reflected by the flag 36, which results in additional light being detected by the detector 46, thereby enabling the reset function. The additional light is reflected off of the flag 36 on the face of the pusher plate 28, as a result of the close proximity of the flag to the toroidal light-pipe.

Based on the foregoing descriptions, a wide variety of shapes and materials may be used to address a diverse array of optical sensing tasks within a document processing device.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising a document processor, wherein the document processor comprises a banknote validator, an optical sensor including a light source, a light detector and an optical element, wherein the optical sensor is adapted so that, during operation, at least a first portion of light from the source that enters the optical element travels along paths in the optical element so as to be re-directed by total internal reflection toward the detector and wherein the total internal reflection is maintained when the light path encounters a surface of the optical element that is wet.

2. The apparatus of claim 1 wherein the light source comprises a light emitting diode.

3. The apparatus of claim 1 wherein the optical element comprises a prism light-pipe structure.

4. The apparatus of claim 3 wherein the prism light-pipe is composed of polycarbonate.

5. The apparatus of claim 3 wherein the optical element comprises a faceted prism structure including a plurality of facets.

6. The apparatus of claim 5 wherein the optical element comprises at least four facets for redirecting light from the light source toward the light detector by total internal reflection.

7. The apparatus of claim 1 wherein the optical element comprises a smoothly curving three-dimensional toroidal light-pipe structure.

8. An apparatus for document processing comprising an optical sensor, a document acceptor portion, and a transport system to move a document into a document storage cassette coupled to the document acceptor portion, the optical sensor including a light source, a light detector and an optical element, wherein the optical sensor is adapted so that, during operation, at least a first portion of light from the source that enters the optical element travels along paths in the optical element so as to be re-directed by total internal reflection toward the detector and wherein the total internal reflection is maintained when the light path encounters a surface of the optical element that is wet.

9. The apparatus of claim 8 wherein the acceptor portion houses the light source and light detector, and wherein the optical element is located such that, during operation of the apparatus, if the document is being pushed into the cassette, the document at least partially blocks light from the optical element that is directed toward the detector.

10. The apparatus of claim 9 wherein the optical element is located adjacent to a slot adapted for the document to pass through from the acceptor portion to the document storage cassette.

11. The apparatus of claim 9 wherein the light source comprises a light emitting diode.

12. The apparatus of claim 9 wherein the optical element comprises a prism light-pipe structure.

13. The apparatus of claim 9 wherein the optical element comprises a faceted prism structure including a plurality of facets.

14. The apparatus of claim 9 wherein the optical element comprises a smoothly curving three-dimensional toroidal light-pipe structure.

15. The apparatus of claim 8 wherein the acceptor portion includes a microcontroller adapted to process signals from the light detector to determine a position of the document with respect to the cassette.

16. The apparatus of claim 15 wherein the microcontroller is adapted to determine, based on signals from the detector, whether the document is being pushed into the cassette for storage therein.

17. The apparatus of claim 16 wherein the microcontroller is adapted to determine, based on signals from the detector, whether the document has completely passed into the cassette.

18. An apparatus for document processing comprising:

an acceptor portion housing a light source and a light detector;

a document storage cassette including a pusher plate with a reflective portion, and an optical element, wherein the light source, light detector and optical element are arranged so that, during operation, a first portion of light from the light source that enters the optical element travels along paths in the optical element so as to be re-directed by total internal reflection toward the light detector and wherein the total internal reflection is maintained when the light path encounters a surface of the optical element that is wet, and wherein, during operation, a second portion of the light that enters the optical element passes through the optical element and is reflected by the reflective portion of the pusher plate toward the detector, wherein an amount of light reflected by the reflective portion toward the detector depends on a position of the pusher plate in the cassette.

19. The apparatus of claim 18 adapted so that, during operation, a document being pushed into the cassette from the acceptor portion at least partially blocks some light from the optical element toward the detector.

20. The apparatus of claim 19 wherein the optical element is located adjacent to a slot adapted for the document to pass through from the acceptor portion to the cassette.

21. The apparatus of claim 18 wherein the reflective portion is adjacent an edge of the pusher plate.

22. The apparatus of claim 18 wherein the reflective portion campuses a reflective foil.

23. The apparatus of claim 22 wherein the acceptor portion includes a microcontroller adapted to process signals from the light detector to determine a position of a document with respect to the cassette.

24. The apparatus of claim 23 wherein the microcontroller is adapted to determine based on signals from the detector whether the document is being pushed into the cassette for storage therein.

25. The apparatus of claim 24 wherein the microcontroller is adapted to determine based on signals from the detector whether the document has completely passed into the cassette.

26. The apparatus of claim 23 wherein the microcontroller is adapted to determine the position of the pusher plate in the cassette based on signals from the detector.

27. The apparatus of claim 23 wherein the microcontroller is adapted to use signals from the detector to determine whether the cassette is full.

28. The apparatus of claim 23 wherein the reflective portion is adapted so that, during operation, it reflects less light back toward the detector when the cassette is filled, compared to an amount of light it reflects back toward the detector when the cassette is not full.

29. The apparatus of claim 18 wherein the optical element comprises a prism light-pipe structure.

30. The apparatus of claim 29 wherein the prism light-pipe is composed of polycarbonate.

31. The apparatus of claim 18 wherein the optical element comprises a faceted prism structure including a plurality of facets.

32. The apparatus of claim 31 wherein the optical element comprises at least four facets for redirecting light from the light source toward the light detector by total internal reflection.

33. The apparatus of claim 18 wherein the optical element comprises a smoothly curving three-dimensional toroidal light-pipe structure.

34. The apparatus of claim 33 wherein the optical element includes a web structure adapted so that, during operation of the apparatus, the second portion of light is leaked through the optical element via the web structure.

35. The apparatus of claim 34 wherein the web structure is composed of polycarbonate.

36. The apparatus of claim 18 wherein the acceptor portion comprises a banknote validator.

37. An apparatus comprising a document processor, wherein the document processor comprises a bill acceptor, an optical sensor including a light source, a light detector and an optical element, wherein the optical sensor is adapted so that, during operation, at least a first portion of light from the source that enters the optical element travels along paths in the optical element so as to be re-directed by total internal reflection toward the detector and wherein the total internal reflection is maintained when the light path encounters a surface of the optical element that is wet.

* * * * *